United States Patent
Faris et al.

[15] 3,697,985
[45] Oct. 10, 1972

[54] REAR END WARNING SYSTEM FOR AUTOMOBILES

[72] Inventors: William R. Faris, Berkley; William P. Harokopus, Royal Oak, both of Mich.

[73] Assignee: The Bendix Corporation

[22] Filed: Sept. 23, 1970

[21] Appl. No.: 74,755

[52] U.S. Cl............343/5 PD, 343/7 ED, 343/12 A, 180/82.1
[51] Int. Cl.................................................G01s 9/00
[58] Field of Search............343/5 PD, 7 ED, 9, 12 A; 180/82, 82.1, 98; 340/32-34

[56] References Cited

UNITED STATES PATENTS

| | | | |
|---|---|---|---|
| 3,448,822 | 6/1969 | Lone et al. | 180/98 |
| 3,360,775 | 12/1967 | Schroeder | 340/32 |
| 3,312,971 | 4/1967 | Gehman | 343/6.5 LC |
| 3,409,874 | 11/1968 | Bowlen et al. | 180/82 |

Primary Examiner—Benjamin A. Borchelt
Assistant Examiner—N. Moskowitz
Attorney—Lester L. Hallacher and Plante, Hartz, Smith & Thompson

[57] ABSTRACT

The invention is directed to a system which provides an audible or visual indication to a motor vehicle operator when another vehicle approaches the rear end of his vehicle in an adjacent lane or when a potentially interferring object is located behind the vehicle when backing up. The system covers the blind spots which are present on the right and left sides of the vehicle because of the inherent inadequacies of rearview mirrors and also the invisible area at the rear of the vehicle.

A range measuring doppler radar system has its antenna positioned to cover the area which lies on the two sides and behind a vehicle and which normally is within the well known blind spot. The radar system is squarewave modulated to sequentially produce two frequencies $F_1$ and $F_2$. Reflected signals from a moving target produce two doppler signals $fd_1$ and $fd_2$. The comparison of the relevant phases of the two doppler frequencies gives range information. The leading and lagging relationship of the doppler signals is indicative of whether the target is closing or opening with respect to the radar carrying base vehicle. The system is, therefore, readily made responsive to closing targets or slowly opening targets falling within a dangerously close range as the vehicle proceeds along a roadway. Fixed objects such as poles and signs along the road are also prevented from giving a warning signal by the phase information.

When the vehicle is backing up, objects or persons present behind the vehicle are detected and a warning given.

10 Claims, 4 Drawing Figures

INVENTORS
WILLIAM P. HAROKOPUS
WILLIAM R. FARIS
BY
ATTORNEY

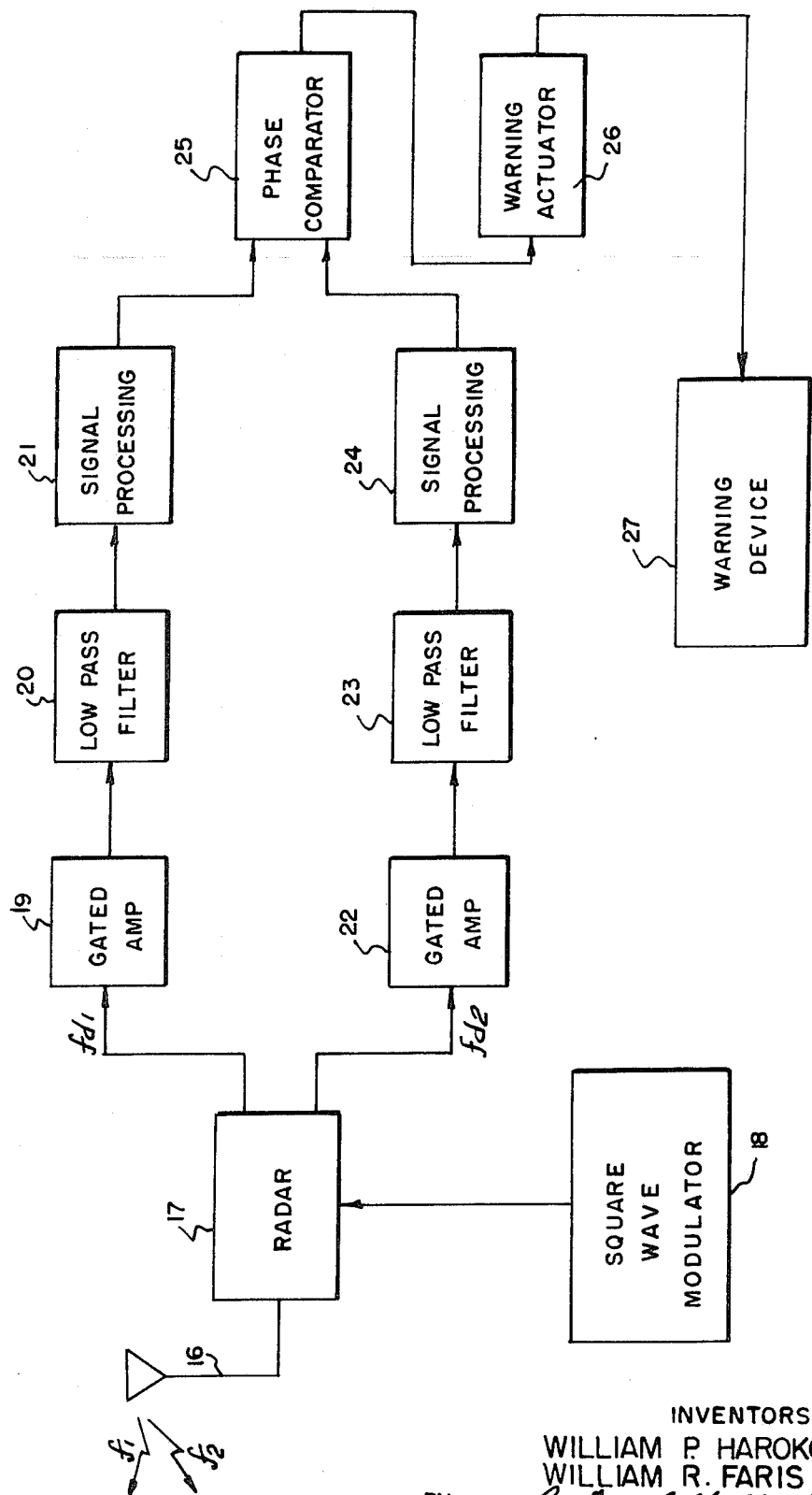

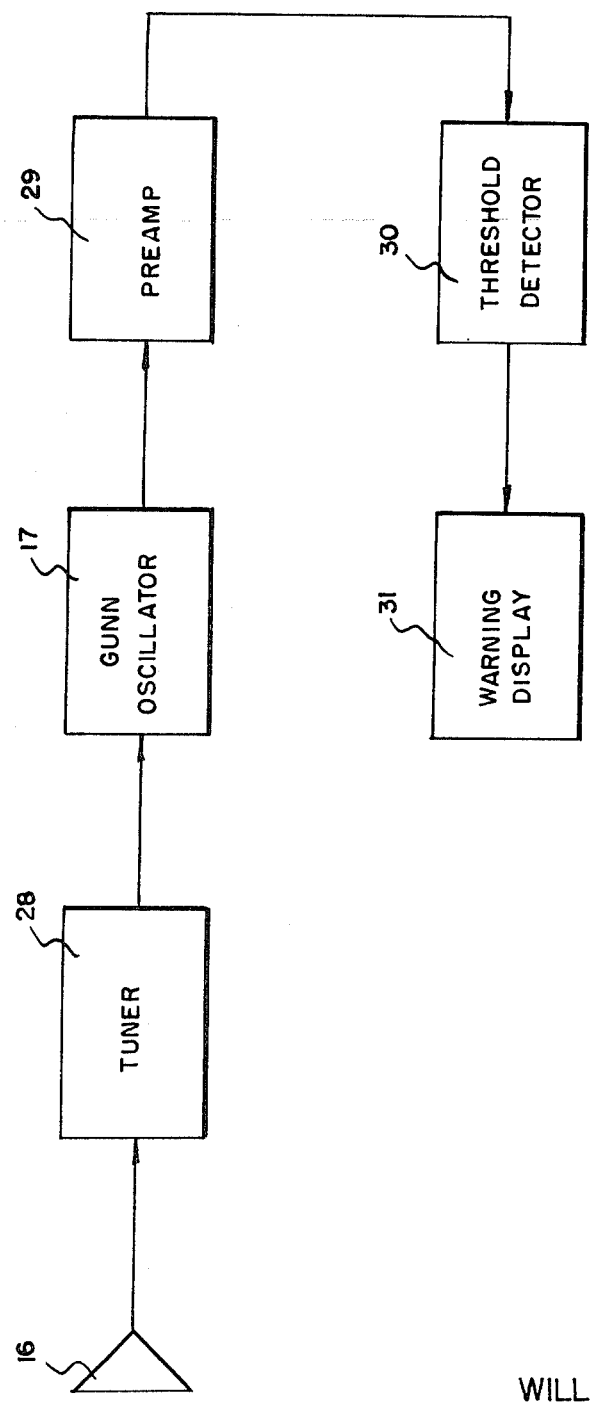

REAR END WARNING SYSTEM FOR AUTOMOBILES

BACKGROUND OF THE INVENTION

Although all automobiles and other motor vehicles contain a rearview mirror system which ordinarily includes an internal mirror and an external mirror, it is well known that there is a blind spot on both sides and to the rear of each motor vehicle which cannot be viewed by use of the mirrors alone. This gives rise to dangerous situations when a driver is attempting to change lanes in instances when he intends to pass a vehicle or he wishes to return to the right lane after passing a vehicle. Because of the blind spot existing in the mirror system, it is necessary for the driver to glance over his shoulder, to directly view the area falling within the blind spot in order for a safe passing or lane changing situation to exist. This is a totally inadequate and intolerable situation for several reasons. Firstly, many drivers are aware of the blind spot but nevertheless do not bother glancing over their shoulders before changing lanes. As a consequence, vehicles which may have driven up behind the lane changing vehicle interfere with the lane changing and fatal or seriously maiming injuries frequently occur. Furthermore, those few careful drivers who do glance over their shoulder in order to do so must take their eyes off the road and the vehicle they are intending to pass, and as a consequence serious and fatal accidents occur because of the brief inattention to the forward motion of the vehicle.

Although doppler radar systems appear to be an obvious solution to the problem of deriving a visual or audible indication of the presence of a vehicle within the blind spot, there is no known successful system available in the prior art. One of the reasons that a successful system has so far not been made available stems from the fact that the system must be sensitive to targets that are within the blind spot and which are within a certain range, and must be insensitive to other vehicles which are without the blind spot or beyond a dangerously close range. As an example, a vehicle which has pulled alongside the vehicle and is, therefore, now visible in the mirrors must not actuate the blind spot detecting system because it obviously would be a false indication. Furthermore, a vehicle which is within the angular view of the blind spot, but which is at a distance exceeding an unsafe distance must not actuate the radar system. Furthermore, the system must be insensitive to fixed roadside objects such as signs and posts and also must be insensitive to vehicles which are opening in distance with respect to the base vehicle as compared to vehicles which are closing with respect to the base vehicle. An operative blind spot warning system must, therefore, possess an angular field of view which is ordinarily associated with the blind spot of the mirror system and be sensitive to targets within a dangerous range, such as 50–100 feet. This is so because vehicles which are within the blind spot, but which are more than 50–100 feet behind the base vehicle do not represent a danger when a change of lanes is desired.

Another dangerous condition which should be eliminated by a totally acceptable system occurs when a vehicle is backing up. In this instance objects, which can be fixed or moving, present directly behind and relatively close to the vehicle cannot be seen by the driver. For this reason objects such as tricycles, trash cans, and other vehicles frequently interfere with the motion of the vehicle. These occurrences are bothersome and expensive, but rarely cause personal injury. However, small children and pedestrians behind the vehicle frequently are seriously injured because they cannot be seen by the driver of the rearwardly moving vehicle.

SUMMARY OF THE INVENTION

The instant invention overcomes the above stated disadvantages by providing a doppler radar warning system which provides an audible or visual indication to the driver of a base vehicle when another vehicle approaches the rear end of his vehicle in an adjacent lane and when the approaching vehicle lies within a range which would make a change of lanes by the base vehicle dangerous.

The invention also provides a warning indication when an object is present behind a rearwardly moving vehicle.

A radar antenna is located on the base vehicle so that the field of view of the antenna is coincident with the rear quadrant over an angle $\theta$ of an area which extends adjacent to the vehicle to a suitable distance behind the vehicle, such as 50–100 feet.

An explanation of a radar system which can be used in the inventive system is described in Application Ser. No. 42,651, filed June 2, 1970 by Radha R. Gupta, and assigned to the assignee of the instant invention. In the referenced system, the transmitter is modulated by a squarewave signal to sequentially produce two transmitted signals having frequencies of $F_1$ and $F_2$. The return of the transmitted signals by reflection from a moving target produces doppler signals $fd_1$ and $fd_2$. The relative phase of the doppler signals is compared to yield range. Accordingly, the radar system can be made insensitive to range signals which extend beyond a dangerous limit. For this reason, only vehicles which are within a minimum distance of the base vehicle will actuate the radar system.

The relevant phase of the two doppler signals is also indicative of whether the moving target is opening or closing. That is, one of the doppler signals, such as $fd_1$, will be leading for opening targets and the other doppler signal, $fd_2$, will be leading for closing targets. The inventive system, therefore, can be made insensitive to opening moving targets as well as fixed targets, such as poles, and signs located along the highway. Accordingly, a warning signal is given only in those instances in which a vehicle is closing upon the radar equipped vehicle and is within a minimum range which is defined as the danger range.

BRIEF DESCRIPTION OF THE DRAWINGS

FIG. 2 is a simplified block diagram of a preferred embodiment of the instant invention useful for indicating dangerous lane changing situations.

FIG. 4 is a preferred embodiment of the instant invention useful for indicating objects behind a rearwardly moving vehicle.

DETAILED DESCRIPTION

Figure 1:
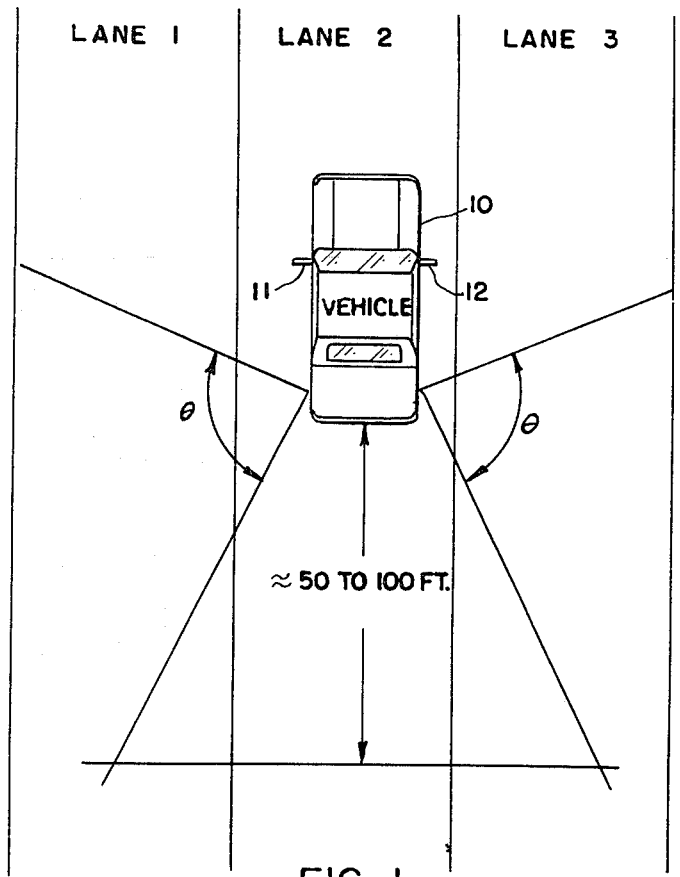
FIG. 1 shows the coverage of the radar system for a vehicle.

FIG. 1 shows a vehicle 10 traveling along a highway having three lanes going in one direction as indicated by the lanes 1, 2, and 3. Even if the vehicle 10 is equipped with two outside mirrors 11 and 12, as well as the usual internal mirror, not shown, two blind spots exist because of the inherent inadequacies of the mirror system. These blind spots are indicated by those areas subtended by the angle $\theta$ on both sides of the vehicle. It is these areas which the radar system is intended to cover in order to indicate the presence of a vehicle in either of the lanes 1 or 3. The system is also intended to be actuated only when a vehicle is also within a minimum range of say 100 feet from the rear of the warning radar equipped vehicle 10.

In order to realize a field of view subtended by an angle $\theta$, it is necessary to properly situate the radar antenna on the vehicle and to design the antenna such that its field of view is equal to the angle $\theta$. These requirements are easily accomplished in a manner well known in the art because the field of view of antennas, that is, the main lobe of the radiation pattern of the antenna can easily be selected to fall within accurately defined angular limits.

Because it is desired to view the areas subtended by the angle $\theta$ on both sides of the vehicle, it may be preferable to equip both sides of the car with an identical antenna. Means of accomplishing this could include the provision of two identical radar systems within the vehicle such that one operates for the left side of the car and the other operates for the right side of the car. Operationally, this would have significant advantages, but would suffer the inherent disadvantage of requiring two complete systems and, therefore, would be quite costly.

An alternative to the redundant system includes providing the vehicle with two separate antennas which share the same radar system. This can be done by sequentially switching the antennas back and forth on the radar system so that they would time share the system. Alternatively, the antennas can be selectably coupled to the radar transmitter by a manual switch. This can readily be affected by coupling the switch for the radar antennas to the turn signal lever so that the driver automatically actuates the right or left radar antenna at the same time he indicates a right or left turn; which is what is normally done when the operator wishes to change lanes.

FIG. 2 is a preferred embodiment of a radar system useful with the invention. The system includes an antenna 16 which transmits signals generated by the microwave radar system 17. Microwave radar unit 17 is a radar system which responds to a varying voltage by generating two discrete frequencies $F_1$ and $F_2$. Accordingly, the signal transmitted by radar 17 is changed between the two frequencies $F_1$ and $F_2$ by use of a squarewave generator 18. As the polarity of the squarewave signal output from the squarewave modulator 18 changes at a selected frequency, the transmitted frequency of the radar signal changes between the frequencies $F_1$ and $F_2$.

The transmitted radiation is reflected from a target and is received by the antenna 16 and input to the radar system 17. The reflected signals are mixed with the transmitted signals to yield two doppler frequencies $fd_1$ and $fd_2$. However, it should be noted that because the transmitted signal is a time-shared frequency differing transmitted signal, the received signal is also a time-shared signal.

Figure 3:
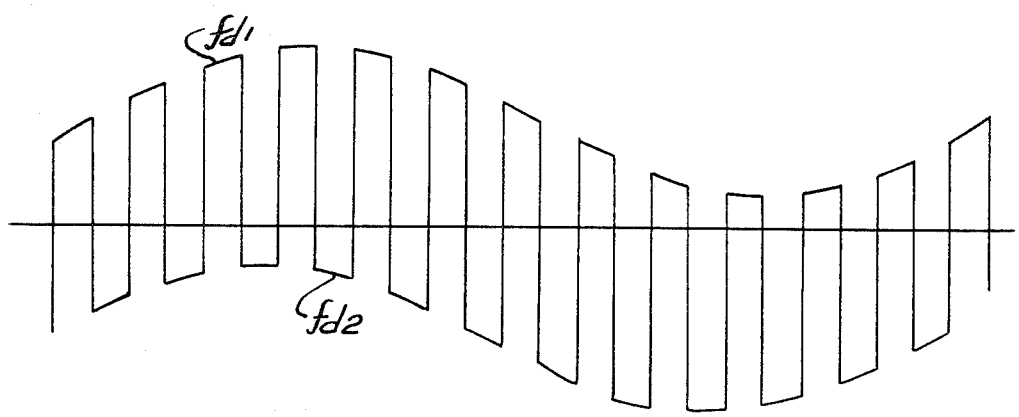
FIG. 3 is a waveform useful in describing the operation of the system.

FIG. 3 illustrates a composite doppler radar signal provided by the radar system of FIG. 3. The signal appears similar to a squarewave signal having a sinusoidally varying amplitude at both the positive and negative ends of the amplitude peaks. The half cycle of the waveform of FIG. 3 is equal to the half period of the squarewave generator frequency. In viewing the waveform of FIG. 3, it should be understood that the waveform actually represents frequency changes and not amplitude changes. Accordingly, the upper envelope of the waveform describes the first doppler frequency $f_{d1}$ while the lower envelope of the waveform describes the doppler frequency $f_{d2}$. It is, therefore, readily apparent that the two doppler frequencies $f_{d1}$ and $f_{d2}$ successively occur, or are time-shared, as is the transmitted signal. Therefore, if the two doppler frequency signals are extrapolated across the void regions of the FIG. 3 configuration, two smooth sinusoidal signals which have different phases will be obtained. The polarity of the phase relationship between these two signals is indicative of the opening-closing relationship between the antenna 16 and the target from which the reflected signals were received.

By rendering the radar system insensitive to signals which are representative of targets lying beyond the maximum range desired to be detected, it is possible to limit the response of the radar system to ranges which are dangerous for following vehicles.

Referring again to FIG. 2, it is noted that the radar receiving system includes two gated amplifiers 19 and 22. These amplifiers are gated conductive and nonconductive in accordance with the frequency of the square wave generator 18 output. Accordingly, gated amplifier 19 is conductive when the doppler frequency $fd_1$ is present, while amplifier 22 is conductive when the doppler frequency $fd_2$ is present. The envelopes of the maximum and minimum values of the waveform of FIG. 2 are, therefore, detected by use of the gated amplifiers. The output of gated amplifier 19 is injected into a low pass filter 20. Filter 20 eliminates the high frequency components of the Fourier analysis of the waveform of FIG. 3. Therefore, in effect the upper envelope of the FIG. 3 waveform is extrapolated across the void areas thereof. The same operation occurs in low pass filter 23 with respect to the doppler signal $fd_2$. The outputs of the low pass filters are respectively injected into signal processing circuits 21 and 24. The signal processing circuits 21 and 24 include the amplifiers and limiters and other such circuits which may be used to render the signals more useful for the intended purpose before their injection into the phase discriminator 25.

Phase comparator 25 compares the phase relationship between the doppler signals $fd_1$ and $fd_2$. The polarity of the output from the phase comparator 25 is indicative of the leading and lagging relationship of the phases of the doppler signals. Accordingly, the output of phase comparator 25 is indicative of whether or not the target is opening or closing with respect to the carrier vehicle. Warning actuator circuit 26 receives the output from phase comparator 25 and includes a limiting circuit which eliminates targets falling beyond a range considered to be dangerous. The warning actuator 26 also is polarity sensitive so that closing or slowly opening target signals are passed through the actuator to the warning device 27.

Warning device 27 can yield either an audible or a visual indication of the dangerous condition and obviously is desired, can yield both. One effective warning technique utilizes the rearview mirrors with an integral lighting system which illuminates the periphery of the mirror or the entire face of the mirror. This provides a natural system for the driver because he naturally and expectantly uses his mirror system in making maneuvers. Another effective system includes that of actuating and deactuating the warning device as the turn signal lever of the vehicle is moved to actuate and deactuate the turn signal lamps. This also provides a natural technique because the driver normally indicates in which direction he desires to change lanes by actuating his turn signals. As mentioned hereinabove, this technique can also be used to switch the radar system back and forth between two antennas located on the vehicle if two antennas are so employed within the system.

The above discussion is directed to a system for giving a warning while a vehicle is in forward motion. FIG. 4 shows an embodiment for giving an indication when the vehicle is in rearward motion. The embodiment of FIG. 4 is intended to detect objects present directly behind a vehicle and therefore must include an antenna the field of view of which covers the area between the two angular fields $\theta$ shown in FIG. 1. The antenna system therefore will include an antenna for viewing the rear of the vehicle and may or may not include the other antennas.

The embodiment of FIG. 4 includes the same Gunn oscillator 17 as the embodiment of FIG. 2. However, because the rearward embodiment of FIG. 4 is not concerned with opening-closing discrimination as is the other embodiment, a less sophisticated system can be employed. Ranging which is adequate for backing-up detection can be achieved by adjusting the sensitivity of the system. Accordingly, the time sharing features of the FIG. 1 embodiment need not be employed. Tuner 28 which is placed between antenna 16' and Gunn oscillator 17 is useful for the range threshold establishment.

The energy transmitted by the system is reflected from objects which are optically hidden from the driver and the reflected energy is received by antenna system 16'. A doppler signal results and is amplified by preamp 29 and is then injected into threshold detector 30. Threshold detector 30 is useful in establishing a minimum level for the system so that spurious signals, such as those from side objects or ground reflections do not cause a warning indication. Threshold detector 30 can also be used to establish a maximum range beyond which a warning signal is not generated.

The output of threshold detector 30 actuates a warning device 31 indicating the presence of a hidden object. Preferably the warning indication will be in audible form because the driver will be looking over his shoulder and therefore may fail to notice a visual indication, irrespective of the location of the indicating device.

The system of FIG. 4 can be incorporated into FIG. 1 by connecting preamplifier 29 at one of the output leads from radar 17 of FIG. 1. The FIG. 4 system is actuated automatically by placing the vehicle in reverse gear, in a manner similar to actuation of the back-up lights of the vehicle.

Because the vehicle is moving, a doppler signal will be received for both fixed and moving objects which are behind the vehicle. Accordingly, property damaging impacts with trash cans and poles are avoided. However, more importantly, the accidental running over of children and pedestrians is also avoided.

The vehicle velocity is usually low when a vehicle is backing-up and the dopper signal is directly proportional to this velocity according to the relationship $fd = 2v/\lambda$
when $fd =$ doppler frequency
$v =$ vehicle velocity
$\lambda =$ wavelength of transmitted energy.
However, even for low velocities doppler signal is obtained and this signal actuates the warning system.

The two systems can conveniently be installed in a single vehicle without interferring with one another because they are separately operable. The rear-end viewing system is operable only when the vehicle is in reverse and the lane changing systems when the vehicle is traveling forward.

What is claimed is:

1. A doppler radar system for detecting the presence of targets within a selected range and angular field of view behind a moving base vehicle comprising:
   an antenna system physically located on said base vehicle and arranged to transmit energy rearwardly of said base vehicle and receive reflected energy from targets present within said selected angular field of view;
   a doppler radar system for energizing said antenna and receiving energy reflected from said targets;
   modulation means for modulating said radar system so that said transmitted energy contains two discrete frequencies which sequentially compose said transmitted signal;
   mixing means for mixing the reflected energy with said transmitted energy to form a composite signal, said composite signal having a first envelope defining a first doppler frequency, and a second envelope defining a second doppler frequency, the phase relationship of said first and second envelopes representing the range of said targets and the leading-lagging relationship of said envelopes being indicative of the closing and opening relationship of said base vehicle and said targets;
   a warning device; and
   means for yielding a warning signal representative of said phase relationship to said warning device, said means for yielding being polarity and amplitude responsive so that warning signals representing closing and slowly opening targets within said angular field of view actuate said warning device.

2. The system of claim 1 wherein said base vehicle includes a rearview mirror system and said angular field of view is selected to cover the blind spot of said mirror system.

3. The system of claim 1 wherein said antenna system includes two antennas having similar characteristics respectively located on opposite sides of said base vehicle.

4. The system of claim 1 wherein said means for yielding includes a phase comparator for comparing the phase relationship of said doppler signals, the polarity of the output of said phase comparator being positive when one of said doppler frequencies is leading and negative when the other of said doppler frequencies is leading.

5. The system of claim 4 wherein said means for yielding including a warning actuator receiving the output of said phase comparator, said warning actuator responding only to signals representing closing targets located within said selected range of said base vehicle.

6. The system of claim 5 wherein said antenna system includes two antennas having similar characteristics respectively arranged on the sides of said base vehicle.

7. The system of claim 6 wherein said antennas are designed and arranged so that said selected field of view is covered by said antennas, and said field of view is similar to the blind spot area of a mirror system provided for said base vehicle.

8. A doppler radar system for detecting objects behind a rearwardly moving vehicle comprising:
   an antenna system having a field of view coincident with the area behind said vehicle which is normally invisible to the operator of said vehicle;
   a radar system for transmitting energy and receiving said reflected energy from objects behind said vehicles;
   warning signal means for giving a warning indication when an object is within said field of view; and
   threshold means for rendering said system insensitive to targets beyond a preselected range.

9. The system of claim 8 including tuning means for establishing a maximum sensitivity for said system.

10. The system of claim 8 wherein said radar system includes a Gunn diode;
   said Gunn diode generating said transmitted energy and mixing said transmitted energy with said reflected energy to produce a doppler signal.

* * * * *